Patented May 8, 1934

1,957,939

UNITED STATES PATENT OFFICE 1,957,939

PROCESS FOR THE PRODUCTION OF CARBOXYLIC ACIDS

Gilbert B. Carpenter, Stamford, Conn., assignor to E. I. du Pont de Nemours & Company, Wilmington, Del., a corporation of Delaware No Drawing. Application August 24, 1931, Serial No. 559,122

11 Claims. (Cl. 260—116)

This invention relates to the synthesis of organic compounds and particularly to the preparation of higher aliphatic acids by the interaction of olefines, carbon monoxide, and steam.

Aliphatic acids of the higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

In my copending application Ser. No. 559,130, a process is described for the preparation of aliphatic carboxylic acids of the higher order by the reaction of steam, carbon monoxide, and an olefinic hydrocarbon, i. e. an alpihatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a catalyst. Another object of the invention is to provide a process for the preparation of acids having the structural formula $RCH_2COOH$ from steam, carbon monoxide, and an olefinic hydrocarbon, the R indicating a substituted or unsubstituted alkyl or aralkyl grouping. Other objects and advantages will hereinafter appear.

I have found that aliphatic carboxylic acids can be prepared from steam, carbon monoxide, and an olefinic hydrocarbon by passing these materials in the vapor phase over a metallic halide. I prefer to use the chlorides, bromides, and iodides of the alkaline earth metals, viz. calcium, barium, and strontium, magnesium, and the alkali metals, viz. soduim, potassium, caesium, rubidium, and lithium, and more particularly the iodides of these elements. Other halides which may be used include the halides of tin, iron, cobalt, nickel, bismuth, manganese, lead, titanium, zinc, cadmium, and molybdenum. When the last named halides are employed per se, however, they do not generally have as long a life as my preferred halides of the alkali or alkaline earth elements.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 5% by volume of the total reactants have been employed with good results.

The use of pressures in excess of atmospheric, say from 25 to 900 atmospheres, is of advantage. The reaction proceeds over a wide range of temperatures although the optimum temperature varies with specific cases, depending inter alia upon the hydrocarbon being used. Generally the desired reaction can be obtained at from 200–500° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 250-375° C.

Catalysts suitable for the reaction may be prepared from the halides of the alkaline earths or the alkali metals or other elements in the following manner. A solution of a halide, say approximately a 20% solution, is employed to saturate a suitable support, such, for example, as charcoal. The resulting impregnated charcoal is thoroughly dried at a temperature of approximately 120° C. after which it is ready for use as a catalyst for the reaction.

The following example will illustrate one method of practising the invention, although the invention is not limited to the example.

*Example 1.*—A gaseous mixture containing 95 parts by volume of carbon monoxide, 5 parts by volume of ethylene, and 25 parts by volume of steam was passed over a barium chloride catalyst which was prepared and supported as described above in the general method for the preparation of such catalysts. The catalyst was disposed in a suitable catalytic reaction chamber capable of withstanding elevated pressure, and the pressure maintained therein at approximately 700 atmospheres and the temperature at approximately 325° C. Upon cooling the gaseous product a condensate was obtained containing 8% of propionic acid.

*Example 2.*—Under conditions similar to those employed in Example 1 sodium bromide was used as the catalyst. This catalyst gave a condensate containing 15.3% total aliphatic carboxylic acids, predominantly propionic.

*Example 3.*—A gaseous mixture containing by volume 5 parts of ethylene, 95 parts of carbon monoxide with a steam to ethylene and carbon monoxide ratio of 0.30 was passed over a calcium iodide catalyst under a pressure of approximately 700 atmospheres and a temperature of approximately 325° C.,—75% of the ethylene reacted to give a condensate containing 33.4% propionic acid.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

Various changes may be made in the method hereinbefore described without departing from the invention or sacrificing any of the advantages thereof.

I claim:

1. In a process of reacting a gaseous mixture containing an olefinic hydrocarbon, steam, and carbon monoxide and thereby producing an aliphatic carboxylic acid, the step of passing the gaseous mixture over a metal halide as a catalyst for the reaction.

2. In a process of reacting a gaseous mixture containing an olefinic hydrocarbon, steam, and carbon monoxide and thereby producing an aliphatic carboxylic acid, the step of passing the gaseous mixture over a halide of an element selected from the group consisting of the alkaline earth and alkali metals as a catalyst for the reaction.

3. In a process of reacting a gaseous mixture containing an olefinic hydrocarbon, steam, and carbon monoxide and thereby producing an aliphatic carboxylic acid, the step of passing the gaseous mixture over a metal iodide as a catalyst for the reaction.

4. In a process of reacting a gaseous mixture containing an olefinic hydrocarbon, steam, and carbon monoxide and thereby producing an aliphatic carboxylic acid, the step of passing the gaseous mixture over an iodide of an element selected from the group consisting of the alkaline earth and alkali metals as a catalyst for the reaction.

5. In a process of reacting a gaseous mixture containing an olefine, steam, and carbon monoxide and thereby producing an aliphatic carboxylic acid, the step of passing the gaseous mixture over a metal halide as a catalyst for the reaction.

6. In a process of reacting a gaseous mixture containing an olefine, steam, and carbon monoxide and thereby producing an aliphatic carboxylic acid, the step of passing the gaseous mixture over a metal iodide as a catalyst for the reaction.

7. In a process of reacting a gaseous mixture containing ethylene, steam, and carbon monoxide and thereby producing propionic acid, the step of passing the gaseous mixture over a metal halide as a catalyst for the reaction.

8. In a process of reacting a gaseous mixture containing ethylene, steam, and carbon monoxide and thereby producing propionic acid, the step of passing the gaseous mixture over a metal iodide as a catalyst for the reaction.

9. In a process of reacting a gaseous mixture containing ethylene, steam, and carbon monoxide and thereby producing propionic acid, the step of passing the gaseous mixture over barium chloride as a catalyst for the reaction.

10. In a process of reacting a gaseous mixture containing ethylene, steam, and carbon monoxide and thereby producing propionic acid, the step of passing the gaseous mixture over calcium iodide as a catalyst for the reaction.

11. In a process of reacting a gaseous mixture containing ethylene, steam, and carbon monoxide and thereby producing propionic acid, the step of passing the gaseous mixture over sodium bromide as a catalyst for the reaction.

GILBERT B. CARPENTER.